(12) United States Patent
Fischer

(10) Patent No.: US 7,845,487 B1
(45) Date of Patent: Dec. 7, 2010

(54) TRIPPER CAR

(76) Inventor: John S. Fischer, 7272 Old Port Rd., Boulder, CO (US) 88301

( * ) Notice: Subject to any disclaimer, the term of this patent is extended or adjusted under 35 U.S.C. 154(b) by 604 days.

(21) Appl. No.: 11/840,794

(22) Filed: Aug. 17, 2007

Related U.S. Application Data

(60) Provisional application No. 60/822,971, filed on Aug. 21, 2006.

(51) Int. Cl.
*B65G 45/22* (2006.01)

(52) U.S. Cl. .................. 198/495; 198/364; 198/536; 414/397; 239/175

(58) Field of Classification Search .............. 198/364, 198/525, 526, 535, 536, 550.01, 550.2, 495; 414/397; 239/175
See application file for complete search history.

(56) References Cited

U.S. PATENT DOCUMENTS

| | | | |
|---|---|---|---|
| 1,793,246 A | * | 2/1931 | Philips .................. 198/495 |
| 2,367,609 A | | 1/1945 | Prins |
| 2,855,094 A | * | 10/1958 | Zebarth ................. 198/495 |
| 3,580,813 A | * | 5/1971 | Hinchliffe ................. 201/39 |
| 3,815,728 A | * | 6/1974 | Vaughan .................. 198/495 |
| 4,096,040 A | | 6/1978 | Grosko |
| 4,262,849 A | | 4/1981 | Elam |
| 4,417,992 A | | 11/1983 | Bhattacharyya et al. |
| 4,650,598 A | | 3/1987 | Roberts et al. |
| 4,768,645 A | | 9/1988 | Farris |
| 5,140,911 A | | 8/1992 | Holland |
| 5,197,845 A | * | 3/1993 | Snead .................. 414/339 |
| 5,303,579 A | | 4/1994 | Smith, Jr. |
| 5,355,992 A | * | 10/1994 | Baig et al. ................. 198/495 |
| 5,839,565 A | | 11/1998 | McFall |
| 6,098,780 A | | 8/2000 | Kelly et al. |
| 6,790,245 B2 | | 9/2004 | Wolff et al. |

* cited by examiner

*Primary Examiner*—Mark A Deuble

(57) ABSTRACT

A tripper car adapted to transfer particulate material such as coal while maintaining a reduced level of dust proximate the area in which said tripper car moves. The tripper car continuously receives coal from a moving conveyor belt and transfers the coal from a first to a second location. At the second location, the tripper car discharges the coal to a silo that stores the coal for subsequent use by boilers. The tripper car sprays liquid, such as water, to reduce the accumulation of coal dust within a structure in which the tripper car operates as well as to wash the inner walls, ceiling and other proximate surfaces to reduce accumulation of coal dust. The spray pattern is oriented to reduce the spraying of liquid on the coal.

65 Claims, 10 Drawing Sheets

TRIPPER CAR

CROSS REFERENCE TO RELATED APPLICATIONS

Figure 1:
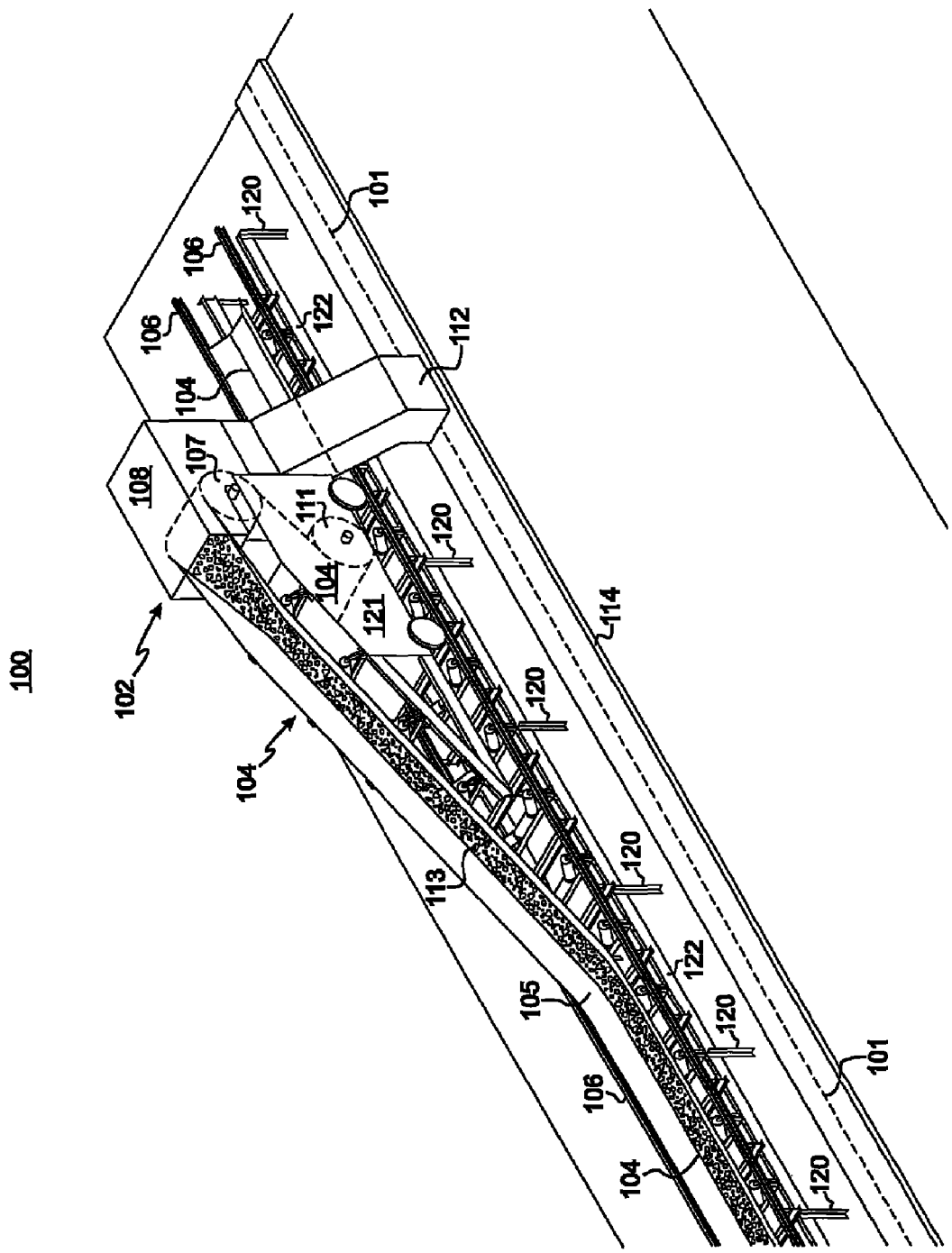

This non-provisional application claims benefit of the filing date of U.S. provisional application Ser. No. 60/822,971 filed 21 Aug. 2006 by the same inventor.

FIELD OF THE INVENTION

This invention relates to a method of and apparatus for routinely eliminating the accumulation of dust on surfaces when particulate material is transferred.

This invention further relates to a method of and apparatus for transferring particulate material, (e.g., coal) while routinely eliminating the accumulation of dust on nearby surfaces.

This invention further relates to a method of and apparatus for transferring coal between locations by a mobile device, such as a tripper car, while routinely eliminating the accumulation of dust on surfaces proximate the tripper car.

PROBLEM

It is known to employ mobile apparatus, such as tripper cars, to receive coal from a moving conveyor belt, to transfer the coal to another location, and to discharge the coal from the tripper car at a discharge site where the coal is stored for subsequent use in boilers. The transfer of coal by the tripper car from the moving conveyor belt to the discharge site generates dust, which pollutes the atmosphere. Dust can also accumulate on the inner elements of a structure in which the tripper car moves.

This generation and accumulation of dust is undesirable and requires costly efforts to control. These efforts include elaborate and expensive fixed pipe wash down systems, and/or frequent manual washing requiring costly labor.

The control of dust when transferring coal is required for environmental, health and safety reasons. Dust is hazardous because an inadvertent spark can ignite the dust and cause a fire, or explosion (deflagration) resulting in injury, deaths and/or massive damage or destruction.

Efforts have been made to reduce dust generation, dust deposit, and dust accumulation. Such efforts include the use of water or suppressants applied to the coal. The use of suppressants has a number of disadvantages. First of all, the suppressant may evaporate and lose its effectiveness. Secondly, the use of suppressants increases the cost of maintenance and operations. Third, the application of suppressants increases the liquid content of the coal. This lowers the BTU value combustion efficiency of the boilers since the liquid must be eliminated from the coal during combustion. The additional amount of heat required for combustion reduces the thermal efficiency of the boilers that consume the coal.

Efforts have also been made to reduce the emission of dust into the atmosphere as well as the accumulation of dust on the inner surfaces of a structure in which the tripper car operates. These efforts include the use of stationary nozzles that spray water throughout the structure in an attempt to remove dust. This is inefficient and costly since it requires a significant amount of piping, valves, nozzles, as well as large quantities of water.

It is a problem that the spraying of suppressants onto coal reduces the thermal efficiency of the boilers that consume the coal. It also causes plugging in the coal chutes; it causes the build-up of fines on conveyor belts and their covers; and it is maintenance intensive and expensive.

It is a further problem that the transfer of coal to silos (or other facilities) for temporary storage can result in the accumulation of suspended dust within the silos. This suspended dust can result in explosions with resulting devastating, injuries to workers and destruction of the plant containing the silos.

SOLUTION

The present invention solves the above and other problems by the provision of methods and apparatus in accordance with which apparatus, such as a tripper car, is equipped with nozzles that spray liquid, such as water or a surfactant, as the tripper car transfers coal from a moving conveyor belt to an inlet of silos. The tripper car nozzles spray the liquid as the tripper car moves along the conveyor belt during transfer of the coal. The liquid may be supplied by a tank mounted on the tripper car or by a flexible hose that couples the tripper car to an external source of liquid.

"Particulate material" as used herein may be coal. However, this invention is applicable to any and all types of particulate material that generate dust during the handling, transfer, or processing of the particulate material. This term also includes material that is combustible as well as material that is noncombustible. Thus, although the invention is described below primarily with reference to coal, it will be understood that the invention may be applied to the transport of any particulate material that generates dust.

In accordance with a possible preferred embodiment of invention, the nozzles on the tripper car may be oriented to spray liquid throughout the structure in which the tripper car operates. This spraying can wash away accumulated dust and avoid explosions.

The tripper car nozzles are oriented to spray from the front and back as well as from each side of the tripper car. The sprays are effective to reduce dust accumulation on nearby surfaces. The nozzles may also be oriented to reduce spray from falling onto the coal.

The sprays maintain the surfaces proximate the tripper car free from dust. Both the lateral and upwardly oriented nozzles are effective to wash down pipes, beams, or other elements within the structure in which the tripper car moves. The nozzles are oriented so that their sprays are not directed onto the coal transferred by the tripper car. Vertically oriented nozzles are inclined in a forward direction to maintain the area proximate the front of the tripper car free from coal dust.

Further in accordance with another possible preferred embodiment of the invention, the tripper car nozzles may be oriented to spray a mixture of water and chemical surfactant (dust suppressant) into silos that receive the discharged coal. This reduces the accumulation of suspended dust in the silos. The spraying of the chemical surfactant can reduce the levels of dust accumulation to reduce risk of explosions within the silos.

Further in accordance with another possible preferred embodiment of the invention, liquid may be supplied to said tripper car 102 from a tank integral to said tripper car 102, or from a hose connected to an external source of liquid.

ASPECTS

An aspect of the invention comprises apparatus that transfers particulate material between locations, said apparatus comprising:

a mobile device adapted to move along a defined path when in use;

a material inlet to load the conveyor belt on said mobile device that receives said particulate material;

an exit discharge and chutes on said mobile device for discharging said received particulate material from said mobile device; and spray equipment affixed to said mobile device that sprays liquid from said mobile device to reduce the accumulation of dust proximate the area in which said mobile device moves.

Preferably said mobile device comprises a tripper car.

Preferably said defined path comprises rails on which said tripper car moves.

Preferably said material inlet receives said particulate material including coal from a moving conveyor belt.

Preferably said spray equipment comprises nozzles that spray liquid from said tripper car to reduce said accumulation of dust on inner elements of a structure in which said tripper car moves.

Preferably said spray equipment sprays said liquid away from said tripper car while reducing the spraying of said liquid onto said particulate material;

said nozzles have a vertical and lateral spray pattern that reduces spraying of said liquid in a downward direction.

Preferably said spray equipment includes:

a plurality of side pipes;

another pipe fluidically interconnecting said side pipes;

a liquid inlet fluidically coupled to said pipes for receiving liquid from a liquid source;

nozzles fluidically coupled to said pipes;

said nozzles having a spray pattern that is outwardly and upwardly oriented.

Preferably said liquid is applied to said liquid inlet of said spray equipment from a liquid source.

Preferably said liquid source may be external to said tripper car; or integral with said tripper car.

Preferably said liquid includes one or more of: water, dust suppressant liquid, or a surfactant.

Preferably maintenance support apparatus is affixed to said tripper car to facilitate the maintenance of said tripper car.

Another aspect comprises apparatus that transfers particulate material, said apparatus comprising:

a mobile device having a material inlet that receives said particulate material;

an exit duct of said mobile device that discharges said received particulate material from said mobile device; and spray equipment affixed to said mobile device that sprays liquid outwardly from said mobile device to reduce the accumulation of dust on surfaces proximate said mobile device.

Another aspect comprises apparatus including a tripper car for transferring a particulate material including coal from a material source to a material destination, said apparatus comprising:

a material inlet of said tripper car that receives said particulate material from a moving conveyor belt;

a defined path comprising rails on which said tripper car moves;

an exit duct of said tripper car that discharges said received coal from said tripper car to said material destination;

spray equipment affixed to said tripper car to spray liquid into the atmosphere to reduce the accumulation of dust on elements of a structure in which said tripper car moves.

Preferably said spray equipment comprises nozzles having spray patterns that reduces spraying of said liquid onto said coal.

Preferably said spray equipment comprises a liquid inlet coupled to a liquid source that may be external to or integral with said tripper car.

Preferably said spray apparatus 13 includes:

nozzles oriented to spray a mixture of water and chemical surfactant from said, tripper car via an inlet of silos to reduce the accumulation of suspended dust in silos;

said spraying of said chemical surfactant reduces the levels of dust accumulation in said silos.

Preferably a liquid inlet of said tripper car is coupled to a flexible hose that supplies said liquid from an external source to said spray equipment of said tripper car.

Preferably said liquid includes one or more of: water, a dust suppressant liquid, or a surfactant.

Preferably said spray equipment comprises nozzles oriented to spray a mixture of water and chemical surfactant from said tripper car an inlet of said silos to reduce the accumulation of suspended dust in silos; and said chemical surfactant is sprayed to reduce the levels of dust accumulation in said silos.

Preferably said spray equipment further comprises apparatus that applied said liquid to said tripper car from a liquid source comprising: a tank mounted on said tripper car; or a flexible hose that supplies said liquid from an external source to said tripper car.

Another aspect comprises a method of operating apparatus that that transfers particulate material: said method comprising the steps of:

moving a mobile device along a defined path;

receiving particulate material on a material inlet of said mobile device;

discharging said received particulate material from an exit duct of said mobile device; and spraying liquid from said mobile device onto said particulate material to reduce the accumulation of dust proximate the area in which said mobile device operates.

Preferably said mobile device comprises a tripper car adapted to move along said defined path comprising rails on which said tripper car moves.

Preferably said material inlet of said tripper car receives particulate material including coal from a moving conveyor belt.

Preferably said method includes the further step of:

generating a spray pattern that reduces the spraying of said liquid in a downward includes: water, or a dust direction; and spraying said liquid away from said tripper car while reducing the spraying of said liquid onto said particulate material.

Preferably said method includes the further step of applying liquid to said spray equipment from a source external to said tripper car or, from a container integral to said tripper car.

Preferably said method includes the further step of fluidically coupling a liquid inlet of said tripper car to a flexible hose that supplies liquid from an internal source to said tripper car.

Preferably said liquid suppressant liquid, or a surfactant.

Another aspect comprises a method of operating a tripper car for transferring particulate material including coal from a material source to a material destination while reducing the generation of dust and accumulation of dust on elements of a structure in which said tripper car operates, said method comprising the steps of:

moving said tripper car on a predefined path comprising rails for transferring said coal from a moving conveyor belt to a material inlet of said tripper car;

discharging said coal from said tripper car via an exit duct of said tripper car to a material destination;

affixing spray equipment to said tripper car;

operating said spray equipment to spray liquid into the atmosphere of said structure to reduce the generation of dust into the atmosphere of said structure during said transfer;

and reducing the generation of said dust as well as the accumulation of dust on the inner elements of said structure.

Preferably said method includes the further step of coupling said liquid inlet of said tripper car to a liquid source comprising: a tank mounted on said tripper car, or a flexible hose that supplies said liquid from an external source to said tripper car as said tripper car.

Preferably said method includes the further step of spraying a mixture of water and chemical surfactant from said tripper car an inlet of said silos to reduce the accumulation of suspended dust in silos.

DRAWINGS

Figure 2:
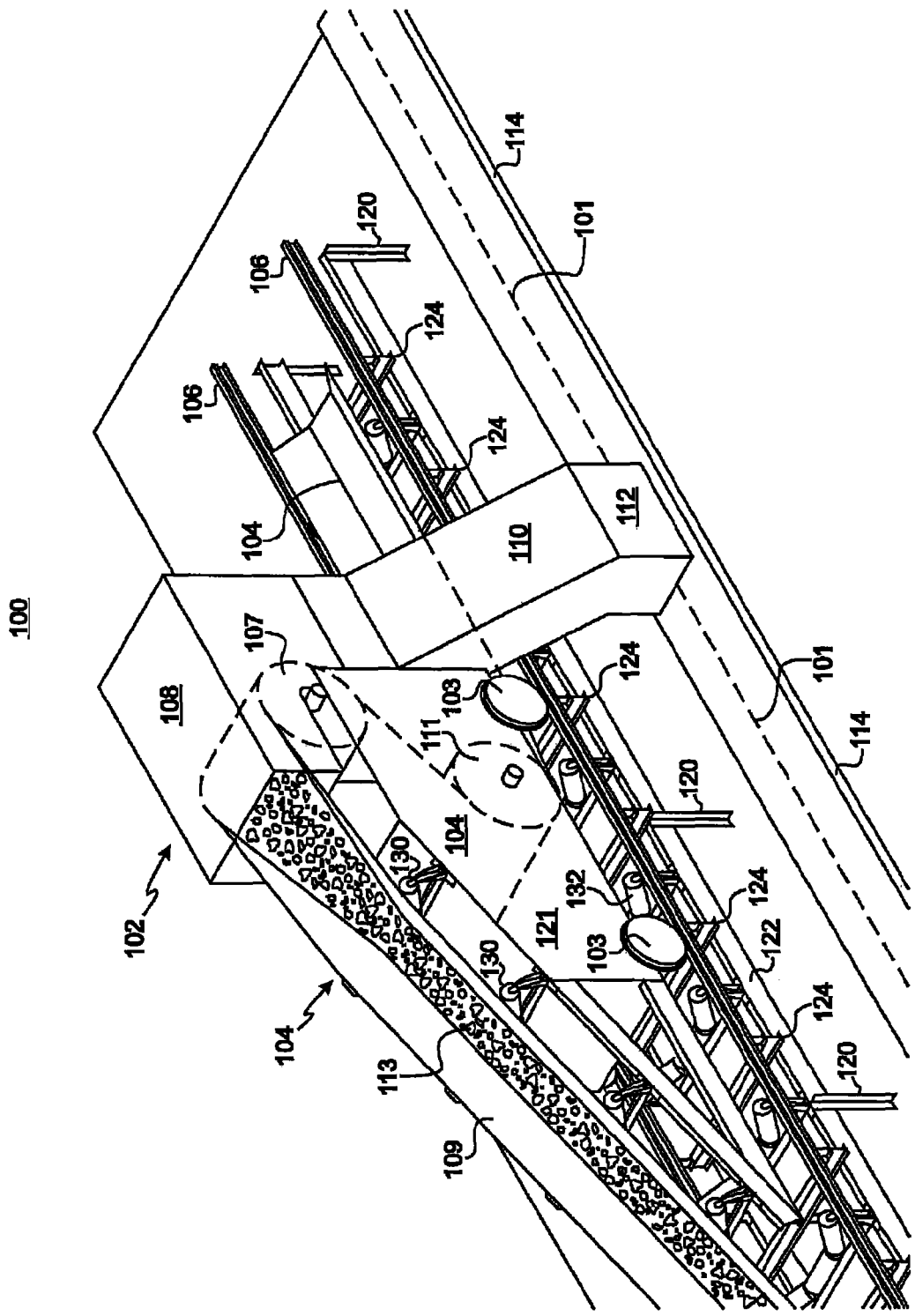

The above and other advantages and features of the invention may be better understood from a reading of the following detailed description of a possible preferred embodiment of the invention taken in conjunction with the drawings in which:

FIGS. 1 and 2 disclose a prior art system that uses a tripper car to transfer coal from a moving conveyor belt to an inlet coupled to one or more silos.

Figure 3:
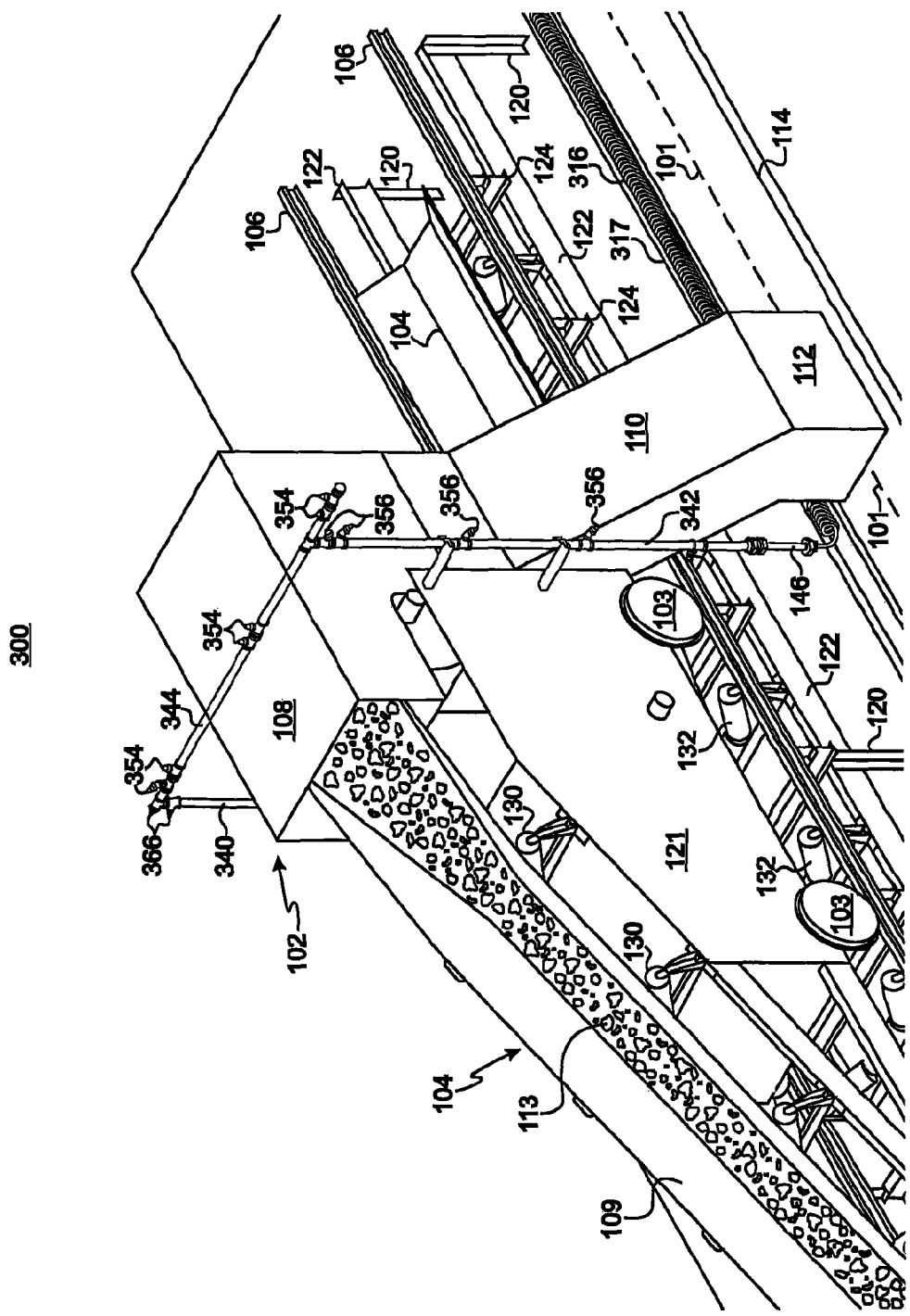
Figure 3A:
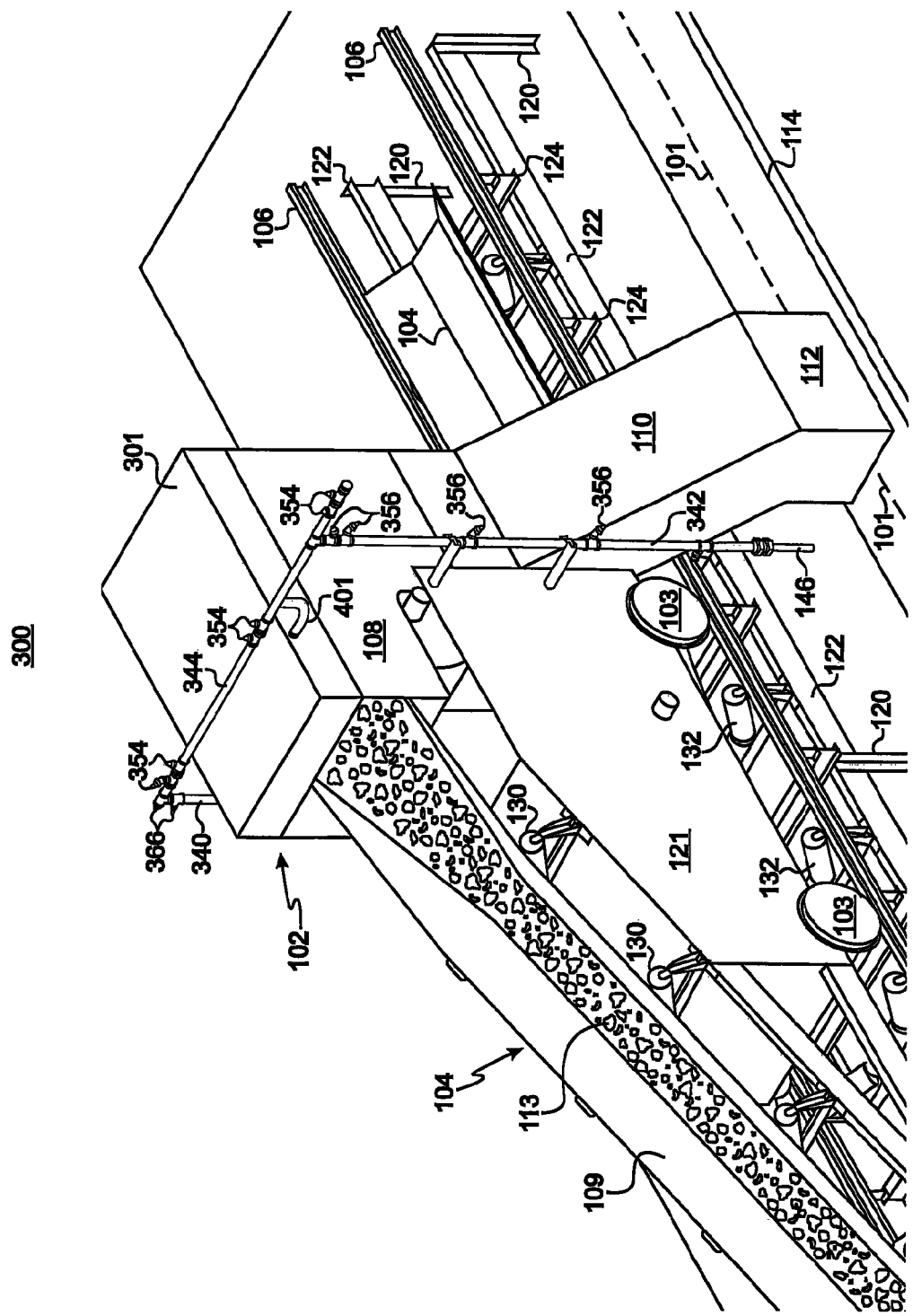

FIGS. 3 and 3A a disclose spray apparatus affixed to a tripper car in accordance with a possible preferred embodiment of the invention.

Figure 4:
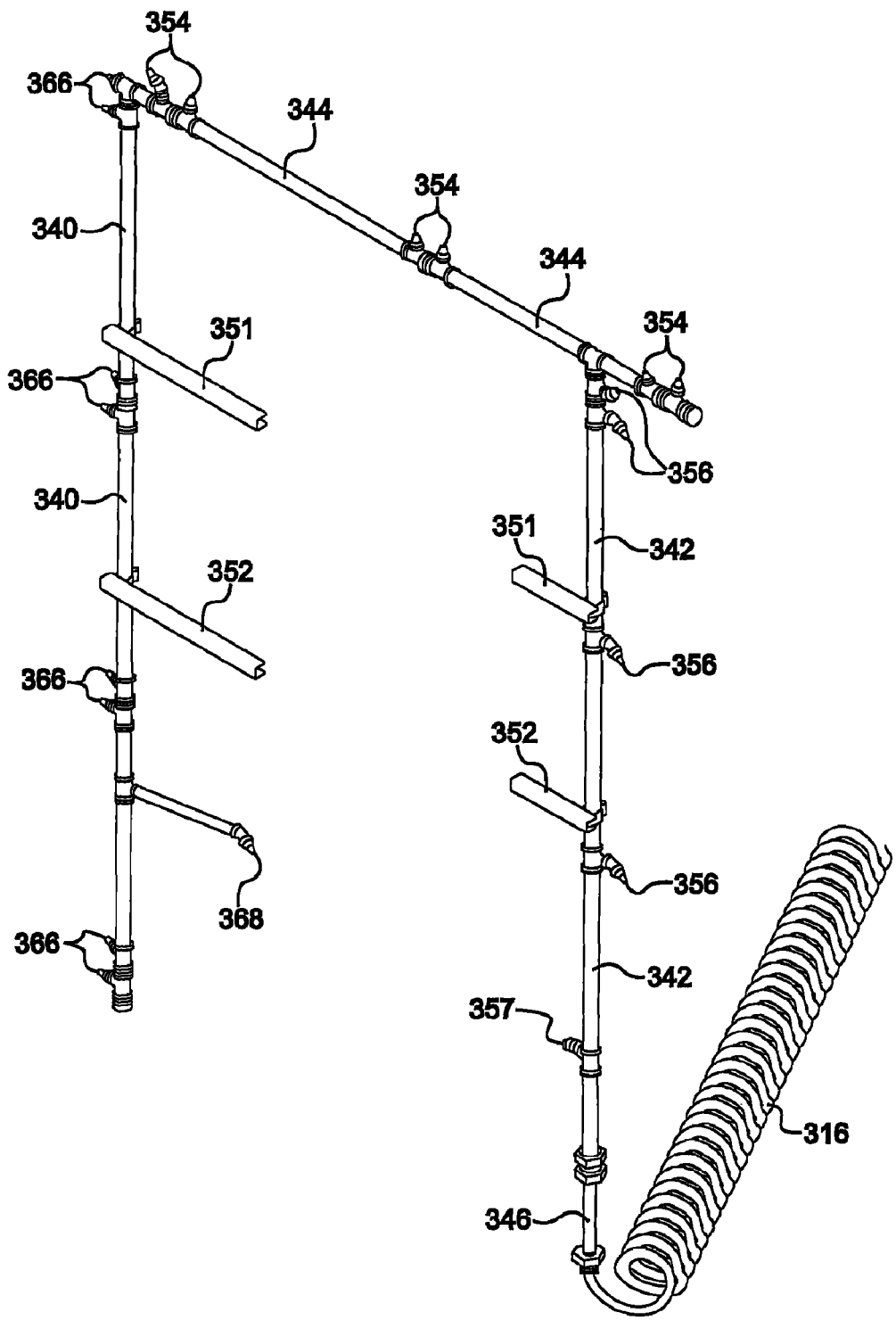
Figure 4A:
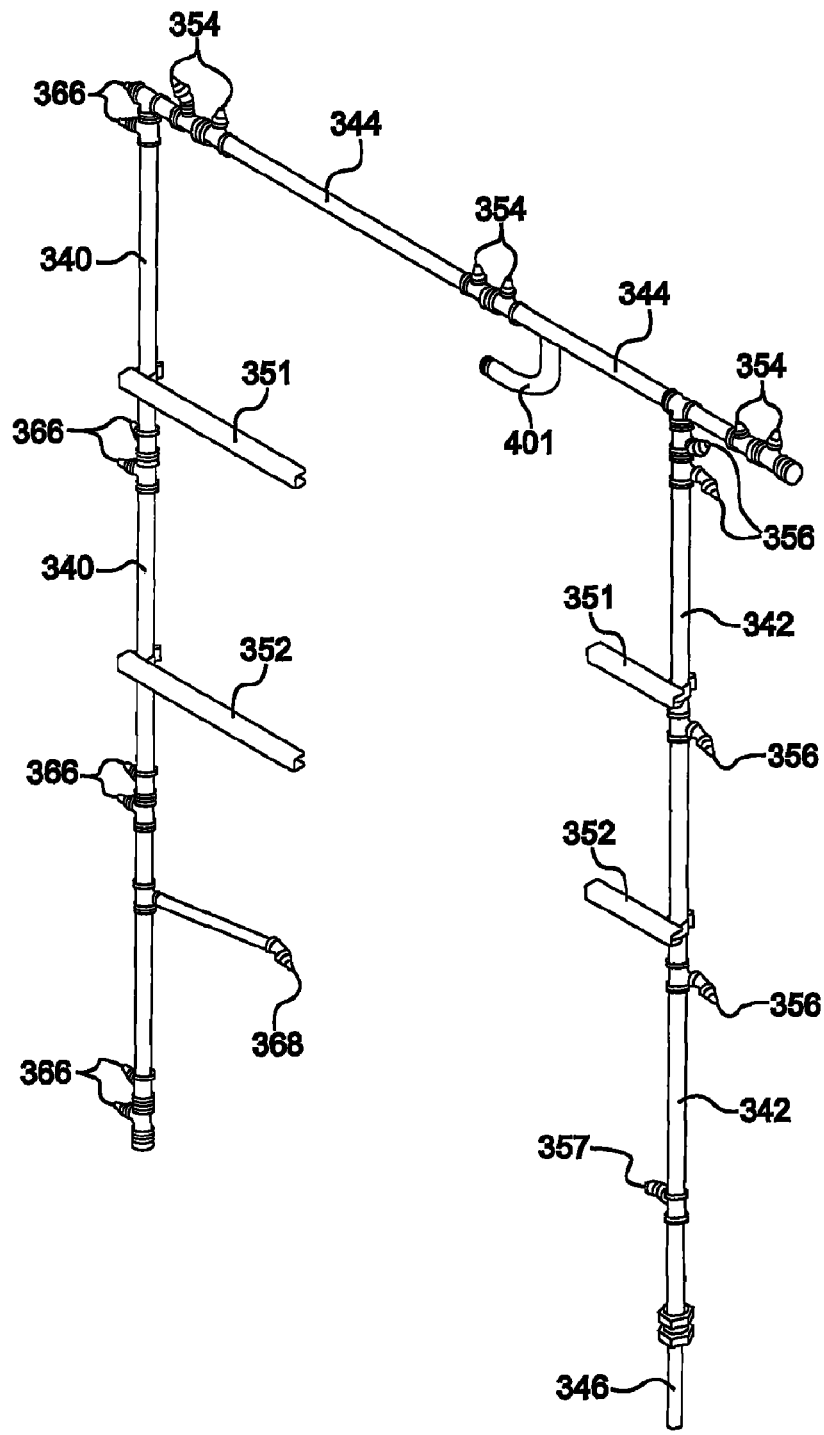

FIGS. 4 and 4A disclose further details of the spray apparatus of FIG. 3.

Figure 5:
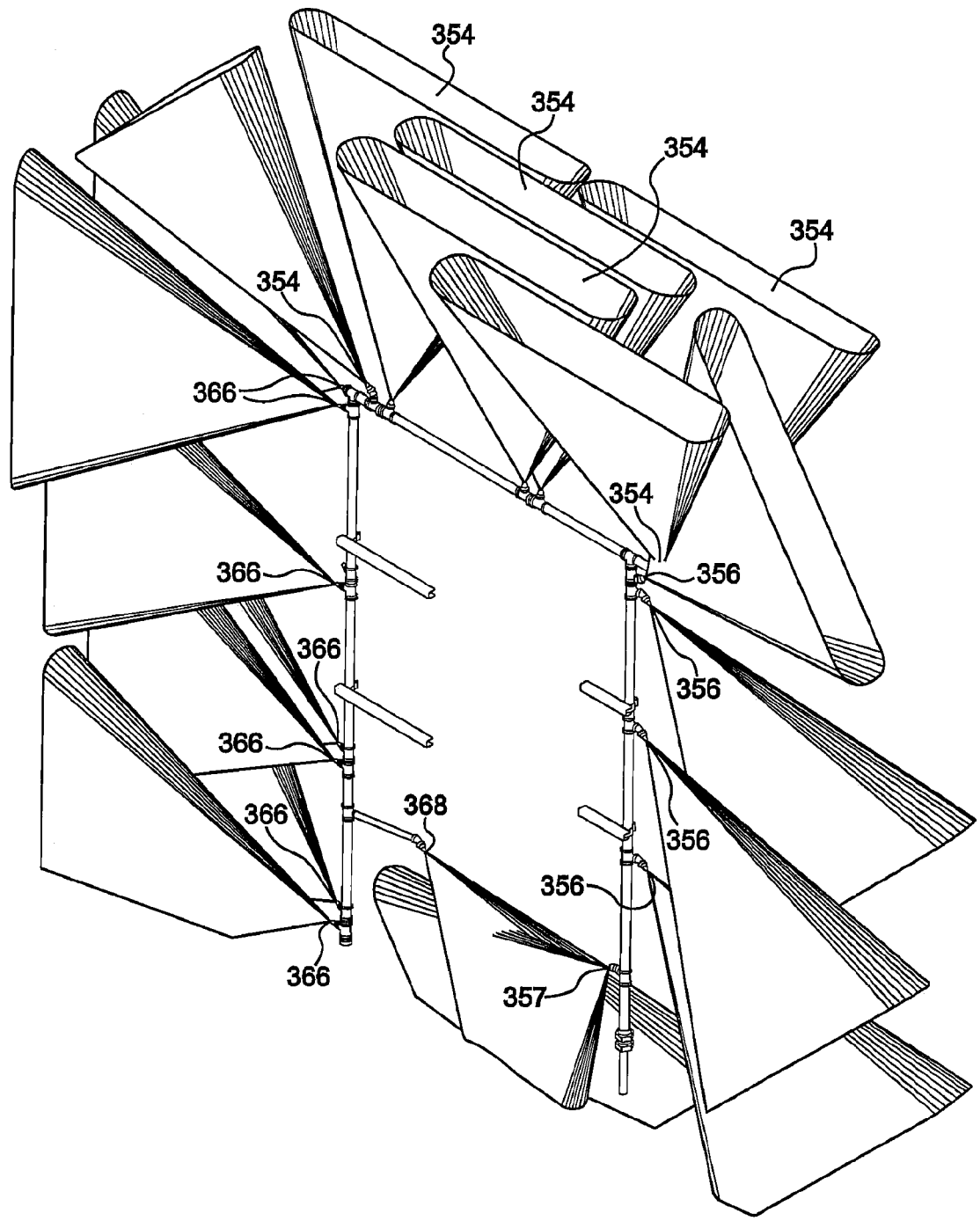

FIG. 5 discloses a spray pattern that may be generated by the spray apparatus of FIG. 4.

Figure 6:
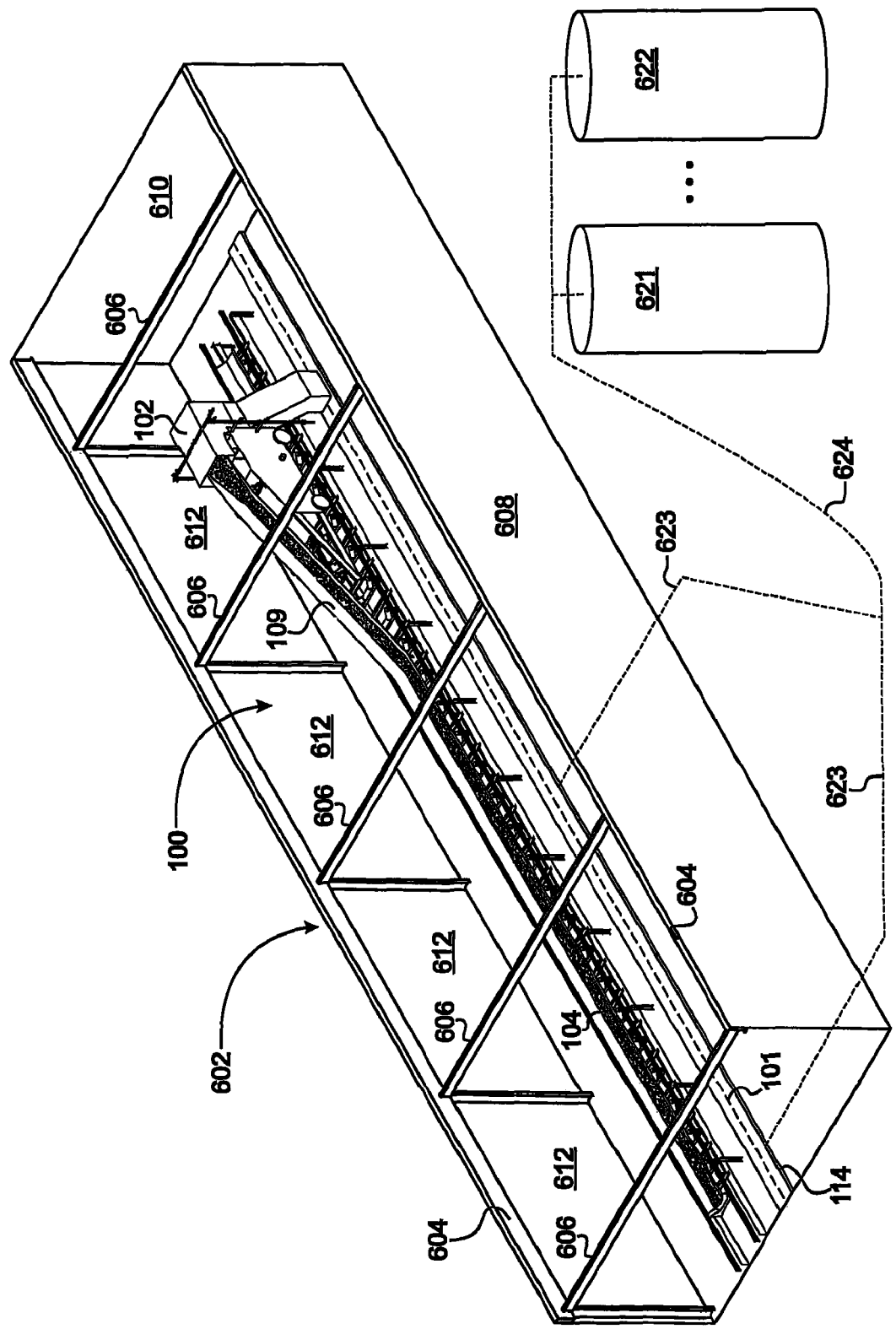

FIG. 6 discloses the apparatus of FIG. 3 positioned within a building.

Figure 7:
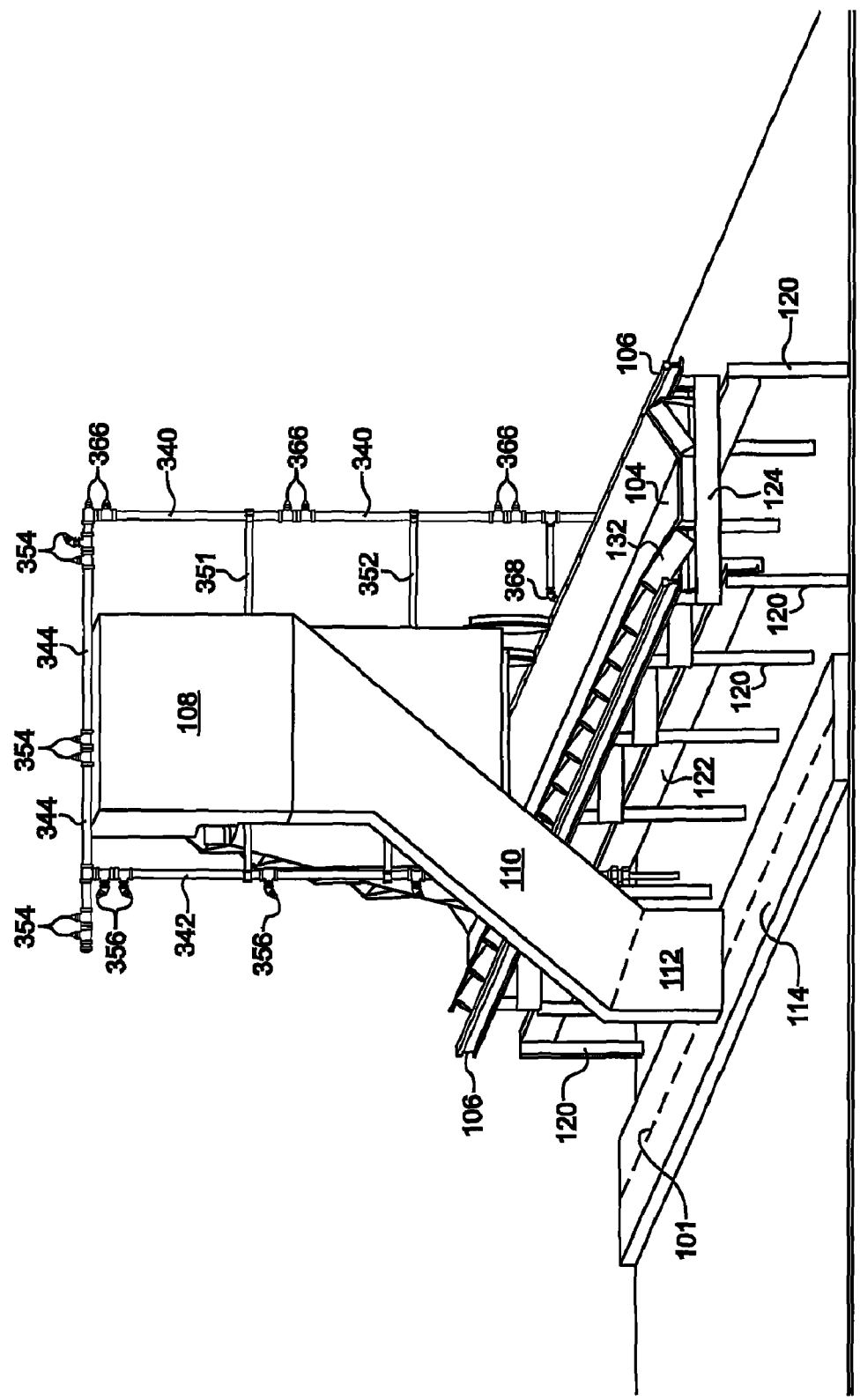
Figure 8:
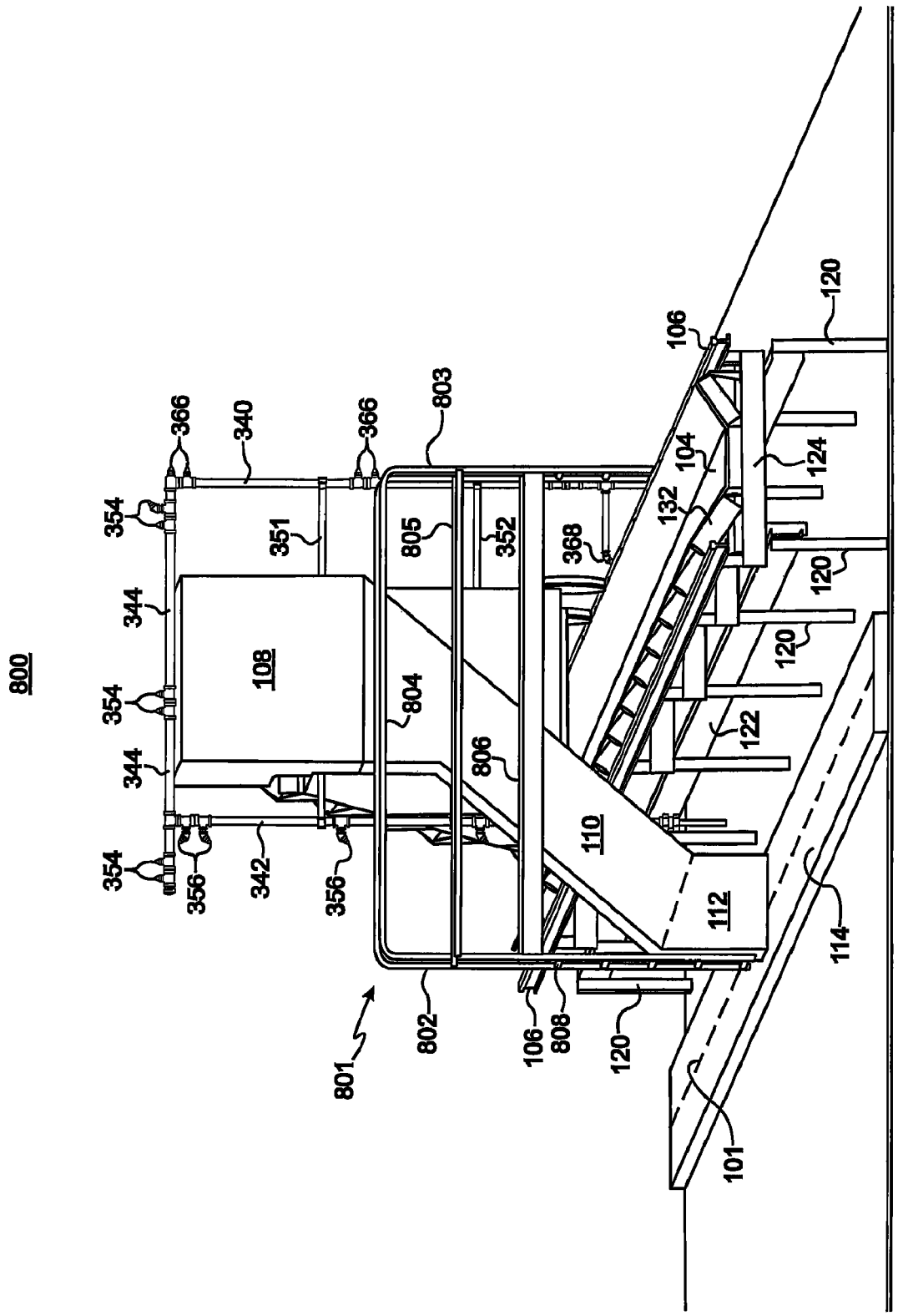

FIGS. 7 and 8 disclose further details of the apparatus of FIG. 3.

DETAILED DESCRIPTION

FIGS. 1-8 and the following description depict specific preferred embodiments of the invention to teach those skilled in the art how to make and use the best mode of the invention. For the purpose of teaching inventive principles, some conventional aspects of the invention have been simplified or omitted. Those skilled in the art will appreciate variations from these possible preferred embodiments that fall within the scope of the invention. Those skilled in the art will also appreciate that the features described below can be combined in various ways to form multiple variations of the invention. As a result, the invention is not limited to the specific possible preferred embodiments described below, but only by the claims and their equivalents.

Description of FIGS. 1 and 2

FIGS. 1 and 2 disclose a prior art system 100 adapted to transfer coal 113 from a moving conveyor belt 104 via tripper car 102 to an elongated inlet 114 coupled to one or more coal storage silos (not shown). Elongated inlet 114 receives the coal 113 discharged by exit duct 112 of tripper car 102 and applies the coal 113 to facilities (e.g., one or more silos) that store the discharged coal 113 for consumption by boilers. System 100 may be contained, at least partially, within the interior of structure 602 shown in FIG. 6. Structure 602 is not shown on FIGS. 1 and 2 to minimize drawing complexity.

System 100 on FIGS. 1 and 2 includes a continuously moving conveyor belt 104 that receives coal 113 from a coal supply (not shown) on its left end on FIGS. 1 and 2. Belt 104 is supported by rollers 132. Element 121 is a side panel. The received coal 113 travels horizontally to the right on conveyor belt 104 until it reaches location 105 of conveyor belt 104 as shown on FIG. 1. At location 105, the coal 113 begins to travel upwardly on the inclined portion 109 of conveyor belt 104 and enters inlet chamber 108 of tripper car 102. Conveyor belt 104 and the coal 113 then pass over roller 107 that dumps the coal 113. Conveyor belt 104 turns downwardly and inwardly on itself on roller 107 and then passes downwardly around roller 111. After the coal 113 falls from conveyor belt 102, the coal 113 falls through duct 110 and exit duct 112. Exit duct 112 directs at the falling coal 113 to elongated inlet 114.

Elongated inlet 114 receives the coal 113 discharged from exit duct 112 and directs the coal 113 to a silo system that stores the coal for subsequent consumption by boilers. Elongated inlet 114 may advantageously be covered on its top by a rubber membrane having a longitudinal slit 101 that receives the coal 113 discharged from exit duct 112. This coal 113 passes through the slit membrane 101 as tripper car 102 moves along the length of elongated inlet 114. Slit membrane 101 reduces the escape of fugitive dust while permitting the discharged coal to pass to the silos.

Tripper car 102 continuously moves back and forth (left and right) as its wheels 103 rotate on rails 106. The relative size of tripper car 102 and moving conveyor belt 104 is best shown on FIG. 6 that also shows structure 602 in which tripper car 102 operates. FIG. 6 shows tripper car 102 positioned near the right end of its movement. In this position, tripper car 102 is proximate the right end 610 of structure 602. Both conveyor belt 104 and tripper car 102 move continuously when in use. The top portion of conveyor belt 104 carries coal 113 and moves continuously from left to right as shown on FIG. 6. In so doing, conveyor belt 104 continuously carries coal 113 from a coal source on its left end to the right end on FIG. 6 for delivery to tripper car 102. Tripper car 102 alternately moves from its left extremity to its right extremity and then reverses direction and moves from its right extremity to its left extremity on FIG. 6. In both directions of movement, tripper car 102 continuously receives coal 113 from conveyor belt 104 and discharges the received coal 113 via exit duct 112 to elongated inlet 114.

Moving conveyor belt 104 receives coal 113 at its left end and continuously moves itself and the coal 113 to the right within structure 602. Tripper car 102 moves at a speed that permits tripper car 102 to receive coal 113 from conveyor belt 104 and to discharge the coal 113 via exit duct 112 to elongated inlet 114. After having discharged its coal 113 and having reached the right end of its travel, tripper car 102 reverses direction and moves from its right to its left. Tripper car 102 continues to receive coal 113 from conveyor belt 104 as its travels to the left. In so doing, tripper car 102 operates as before described and receives coal 113 from conveyor belt 104 and discharges the received coal 113 via exit duct 112 to elongated inlet 114. After reaching the left extremity of its travel, tripper car 102 reverses direction and receives coal 113 from conveyor belt 104 as it begins a travel to the right within structure 602.

With reference to system 100 of FIGS. 1 and 2, it should be understood that: the top portion of conveyor belt 104 continuously travels to the right and continuously receives coal 113 from a coal source at its left end as shown on FIGS. 1, 2 and 6; conveyor belt 104 continuously moves coal 113 up its inclined portion 109; continuously delivers coal 113 into chamber 108 of tripper car 102 whose output comprises duct 110 and exit duct 112; exit duct 112 discharges coal 113 into elongated inlet 114. It should also be understood that tripper car 102 completes its travel towards the right end 610 of structure 602 and then reverses direction to begin a travel to the left during which time tripper car 102 continues to receive coal 113 from moving conveyor belt 104.

As shown on FIGS. 1, 2, and 6, wheels 103 of tripper car 102 rotate on rails 106. Rails 106 are supported by vertical posts 120 as well as by horizontal members 122 and 124. Conveyor belt 104 and the received coal 113 enter chamber 108 of tripper car 102 and travel over roller 107 that causes the coal 113 to fall within chamber 108 of tripper car 102 for discharge via exit duct 112 to elongated inlet 114. Moving conveyor belt 104 then travels downward and around roller 111 and continues its travel to the right as shown on FIGS. 1, 2, and 6. When the top portion of conveyor belt 104 travels to its right extremity as shown on FIG. 6, it wraps downwardly around a roller (not shown) and travels back to the left beneath the apparatus shown on FIGS. 1, 2, and 6 to the left extremity of its travel. Conveyor belt 104 then wraps upwardly around another roller (not shown), travels to the right and receives more coal 113 for delivery to tripper car 102.

Description of FIGS. 3, 3A, 4, and 4A

FIGS. 3 and 4 disclose a possible preferred embodiment of the invention comprising a tripper car 102 equipped with the spray apparatus of FIGS. 3 and 4. This spray apparatus includes a left side pipe 340, a top pipe 344, and a right side pipe 342 having liquid inlet 146. As shown on FIGS. 3 and 4, liquid inlet 146 is adapted to fluidically couple the spray system of FIGS. 3 and 4 to an external source of liquid. Inlet 146 is shown coupled on FIGS. 3 and 4 via coiled hose 316 to an external source liquid (not shown) which may be provided by the structure in which tripper car 102 operates. Hose 316 is recessed in a trench 317 in the floor of structure 602. Hose 316 is known commercially as the Energy Chain and is available from IGUS of Germany. Hose 316 is adapted to be continuously flexible to permit tripper car 102 and spray system of FIG. 4 to be supplied with liquid when tripper car 102 moves back and forth on rails 106 shown on FIG. 6. The embodiment shown in FIG. 3 is advantageous in that hose 316 and its connection to an external source of liquid permits tripper car 102 to be operated continuously in receiving coal from conveyor belt 104 and in discharging coal 113 continuously to elongated inlet 114. This embodiment does not require tripper car 102 to stop to receive liquid. However, in some instances, a convenient source of external liquid may not be available. In this event, the possible preferred embodiment of the invention shown in FIGS. 3A and 4A is used to provide liquid to tripper car 102. In accordance with this possible preferred embodiment, liquid that is stored in tank 301 may be mounted on tripper car 102 as shown out on FIG. 3A. Tank 301 stores the liquid required to operate the spray system of FIGS. 3A and 4A. Tank 301 may be sized to permit tripper car 102 to operate for acceptable time duration before being required to stop to refill tank 301 with liquid.

Spray nozzles 354, 356, and 366 are affixed to pipes 340, 344 and 342. These spray nozzles generate a spray pattern such as shown on FIG. 5. Nozzles 366 and 368 are attached to left side pipe 340. These nozzles may be adjusted to generate spray patterns such as shown on FIG. 5 to maintain the area proximate the left side of tripper car 102 free of accumulated dust. The spray pattern may also spray the left walls of structure 602 to keep them free of accumulated dust. Nozzles 356 and 357 on FIG. 4 are fluidically connected to right side pipe 342. Nozzles 356 generate controllable spray patterns as shown on FIG. 5 to maintain the area proximate the right side of tripper car 102 free from accumulated dust. Nozzles 357 and 368 apply spray inwardly to maintain the area beneath tripper car 102 free of accumulated dust.

Nozzles 354 are affixed to the top pipe 344. These nozzles generate the spray patterns shown on FIG. 5. Nozzles 354 generate an upwardly inclined controllable spray pattern that maintains the area above the tripper car free of coal dust. These nozzles also spray the ceiling and upper beams of structure 602 to remove accumulated coal dust. Element 346 is the fluid inlet of the spray system of FIG. 4.

Description of FIG. 5

FIG. 5 illustrates a typical spray pattern that may be generated by the spray apparatus of FIGS. 3, 3A, 4, and 4A. As shown, the nozzles of FIG. 5 are oriented to generate a spray pattern that extends laterally from the sides of the tripper car 102 as well as inclined upwards above tripper car 102. The spray pattern is adjustable to reduce the amount of spray that falls onto the coal. The vertical spray pattern may be adjusted to generate a spray either in front of tripper car 102 or laterally from tripper car 102 to avoid generating spray that falls back onto the coal delivered to elongated inlet 114.

Further in accordance with the invention, the tripper car nozzles may be oriented, when required, to spray a mixture of water and chemical surfactant (dust suppressant) into silos to reduce the accumulation of suspended dust in the silos. The spraying of the chemical surfactant can reduce the levels of dust accumulation to reduce risk of explosions within the silos. The spraying of chemical suppressant into the silos occurs when the nozzles direct the suppressant downward into elongated inlet 114 that carries the sprayed material to the silos. The amount of sprayed material received by the silos is determined by the orientation of the nozzles of the tripper car. The orientation is controlled by the operator of the tripper car. If the operator desires that a minimal amount of suppressant be applied to the silos, the nozzles may be oriented to reduce the amount of suppressant sprayed into elongated inlet 114. Conversely, if the operator desires to increase the level of suppressant directed to the silos, the nozzles may be oriented to achieve this goal. Ideally, the amount of suppressant directed to the silos should be limited to the minimum amount required to control the dust accumulation within the silos while not applying an excessive amount of suppressant that would reduce the thermal efficiency of the coal in the silos.

The quantity of suppressant directed to the silos may also be determined by controlling the amount of the spray applied to nozzles whose spray patterns are not directed to elongated inlet 114. A maximum amount of suppressant can be applied to the silos by turning off the nozzles not involved in serving elongated inlet 114. The amount of suppressant directed to the silos may also be controlled by reducing or increasing the left-right movement cycles of the tripper car 102 during which the suppressant is applied to the spray system of tripper car 102.

The operator of the tripper car may also control the fluid that is sprayed by controlling the water chemical suppressant applied to fluid inlet 146. The system operator may also reduce or increase the amount of chemical suppressant applied to the silos by reducing or increasing the cycles of the tripper car during which water or chemical suppressant is applied to liquid input 146.

Description of FIG. 6

FIG. 6 discloses tripper car system 100 positioned within structure 602. Structure 602 includes right end 610, a front 608, a rear 612, and overhead beams 604 and 606. The ceiling of structure 602 is not shown on FIG. 6 to minimize drawing complexity. The spray apparatus mounted on tripper car 102 in accordance with the present invention generates sprays patterns, which are effective to maintain the inner areas and surfaces within structure 602 relatively free from accumulated coal dust. This spray equipment is also sufficient to spray the ceiling (not shown) as well as beams 604 and 606 and inner elements of structure 602 to keep them free of accumulated coal dust.

FIG. 6 also discloses a plurality of silos 621 and 622 which receive coal from elongated inlet 114. The coal is stored in the silos 621 and 622 for subsequent use by boilers (not shown) in which the coal is consumed. Silos 621 and 622 receive the coal via elements 623 and 624. Element 623 it is operationally connected coupled to elongated inlet 114. As priorly described, exit duct 112 discharges coal through membrane 101 into elongated inlet 114. Inlet 114 receives the coal and passes it via elements 623 and 624 to silos 621 and 622. Elements 623 and 624 as well as silos 621 and 622 it are shown diagrammatically to minimize drawing complexity. The design details of silos 621 and 622 as well as of elements 623 and 624 will depend upon the size and configuration of the elements shown on FIG. 6. The size and number of silos may vary. The details of elements 623 and 624 will vary depending upon the length of elongated inlet 114 as well as the quantity of coal transported by tripper car 612 and discharged into elongated inlet 114. Element 624 is an inclined conveyor that delivers coal to the top of silos 621 and 622. The details of these elements will be dictated by the requirements of each commercial application.

Description of FIG. 7

FIG. 7 discloses further details of the apparatus of FIGS. 3 and 3A. FIG. 7 is a view from this right extremity of the apparatus shown on FIGS. 3 and 3A. FIG. 7 discloses chamber 108 as well as duct 110, and exit duct 112 of tripper car 102. Chamber 108, duct element 110, and exit duct 112 receives the coal discharged by moving conveyor belt 104 in chamber 108 of tripper car 102. The portion of moving conveyor belt 104 shown on the right side of FIG. 7 has traveled through tripper car 102; has unloaded coal to chamber 108 via duct 110 and exit duct 112; and has completed its travel around rollers 107 and 111 of FIG. 2. This end segment of conveyor belt 104 engages rollers (not shown), which move conveyor belt 104 downwardly and wrap around a roller (not shown) for return back to the left extremity of conveyor belt system 100. Upon its return to the left extremity of its travel on FIG. 6, belt 104 moves upwardly around another roller (not shown) and receives coal 113 for delivery to tripper car 102.

Description of FIG. 8

FIG. 8 illustrates the apparatus of FIG. 7 equipped with maintenance support structure 800 that permits workers to inspect and maintain chamber 108 and duct elements 110 and 112 as well as the nozzles and pipes of the spray system. The maintenance support structure 800 permits maintenance personnel to manually adjust the orientation of the spray nozzles as well as to clean the nozzles when required.

Maintenance structure 800 disclosed on FIG. 8 includes support structure 801. Structure 801 includes horizontal top handrails 804, horizontal center handrails 805, and bottom horizontal structure comprising a walkway 806 that may be used by maintenance personnel. Support structure 801 further includes a pair of left handrail members 802, a pair of right handrail members 803 and ladder 808 that provide support to enable maintenance personnel to use walkway 806.

EPILOGUE

It is to be understood that while possible preferred embodiments of the invention are shown herein, other possible preferred embodiments are possible without departing from the scope of the present invention. The fluid used to power the spray system may be water or any other liquid or surfactant or any material suitable for suppressing coal dust and coal dust accumulations. The present description describes a possible preferred embodiment of the invention adapted for maintaining a structure and its environment free of dust accumulations. It is to be understood that the tripper car and its spray system need not be used inside a structure.

In accordance with possible preferred embodiments of the invention, the preceding has' described tripper car 102 as being movable on a fixed path defined by rails 106. Other preferred embodiments are possible. Rails need not be used. Other mechanisms for controlling the path of the tripper car may be used in accordance with the invention. For example, grooves may be formed in a horizontal surface in which the tripper car operates. These grooves can direct wheels or other elements of the tripper car along a defined path. The path may also be controlled by an operator using remote control apparatus to steer the tripper car in a chosen path.

It should be appreciated by those skilled in the art that the apparatus and process of the present invention may be applied to any the material that is capable of generating dust when transferred. The material need not be combustible. The material may be of any type that generates dust when transferred. It should also be understood that the method and apparatus of the present invention may be operated either partially or fully contained within a structure or a building. The method and apparatus embodying the present invention may be operated in an outdoor environment in which control of dust is desired when transferring particulate material.

The preceding has described tripper car 102 as being continuously movable to discharge particulate material applied to elongated inlet 114 covered by a split membrane 101. It should be understood that the speed of conveyor belt 104, and the speed of tripper car 102, are interdependent. The reason for this is that tripper car 102 must operate so that its rate of discharged coal 113 to exit duct 112 is compatible with the input rate of the coal 113 received by tripper car 102 from conveyor belt 104. The speed of the tripper car 102 is also related to the length of elongated inlet 114. If it is desired that the discharged coal 113 be distributed equally along the length of elongated inlet 114, the length of elongated inlet 114, and the rate at which tripper car 102 moves along the length of elongated inlet 114, and the rate at which conveyor belt 104 applies coal 113 to tripper car 102 are all interrelated.

At one extreme, tripper car 102 need not move and may remain stationary. In this case, coal received from conveyor belt 104 is discharged to a single location by exit duct 112 of tripper car 102. This single location could comprise a large opening capable of receiving the discharged coal. As another possibility, the discharged coal could be distributed to an inlet of a shorter length than that shown on the attached drawings for elongated inlet 114. In this case, tripper car 102 would move this shorter length to distribute the discharge coal evenly along the shorter length of the elongated inlet. As another possibility, the discharged coal could be evenly distributed to an inlet having a longer length as determined by the needs of the operator of the facility.

It should be understood in view of the above, that the preceding detailed description of possible preferred embodiments are only illustrative. In another possible preferred embodiment, tripper car 102 may be operated to distribute coal to a material inlet whose dimensions are chosen to accommodate the needs of the operator of the facility in which tripper car 102 operates. The inlet may be a single location, and maybe linear or curved or of any irregular shape as determined by the needs of the facility.

The invention claimed is:

1. Apparatus that transfers particulate material between locations, said apparatus comprising:
   a mobile device adapted to move along a defined path when in use;
   a material inlet on said mobile device that receives said particulate material;
   an exit duct or chutes on said mobile device for discharging said received particulate material from said mobile device; and
   spray equipment affixed to said mobile device that sprays liquid from said mobile device to reduce the accumulation of dust on surfaces proximate the area in which said mobile device moves, said spray equipment including
   (a) a plurality of side pipes;
   (b) another pipe that fluidically interconnects said side pipes;
   (c) a liquid inlet fluidically coupled to said pipes for receiving liquid from a liquid source; and
   (d) a plurality of nozzles fluidically coupled to said pipes, said nozzles having a spray pattern that is outwardly and upwardly oriented.

2. The apparatus of claim 1 wherein said mobile device comprises a tripper car.

3. The apparatus of claim 2 wherein said defined path comprises rails on which said tripper car moves.

4. The apparatus of claim 2 wherein said material inlet receives said particulate material including coal from a moving conveyor belt.

5. The apparatus of claim 2 wherein said nozzles spray liquid from said tripper car to reduce said accumulation of dust on inner elements of a structure in which said tripper car moves.

6. The apparatus of claim 5 wherein said nozzles spray said liquid away from said tripper car while reducing the spraying of said liquid onto said particulate material, said nozzles having a vertical and lateral spray pattern that reduces spraying of said liquid in a downward direction.

7. The apparatus of claim 2 wherein said liquid is applied to a liquid inlet of said spray equipment from a liquid source.

8. The apparatus of claim 7 wherein said liquid source may be external to said tripper car or integral with said tripper car.

9. The apparatus of claim 1 wherein said liquid includes one or more of: water, dust suppressant liquid, or a surfactant.

10. The apparatus of claim 3 further including maintenance support apparatus affixed to said tripper car to facilitate the maintenance of said tripper car.

11. Apparatus that transfers particulate material, said apparatus comprising:
   a mobile device having a material inlet that receives said particulate material;
   an exit duct or chute of said mobile device that discharges said received particulate material from said mobile device; and
   spray equipment affixed to said mobile device that sprays liquid outwardly from said mobile device to reduce the accumulation of dust on structure proximate said mobile device.

12. A method of operating apparatus that transfers particulate material, said method comprising the steps of:
   moving a mobile device along a defined path;
   receiving particulate material on a material inlet of said moving device;
   discharging said received particulate material from an exit duct of said mobile device;
   spraying liquid away from said tripper car while substantially avoiding the spraying of said liquid onto said particulate material prior to said discharge; and
   generating a spray pattern that substantially avoids the spraying of said liquid in a downward direction.

13. The method of claim 12 wherein said mobile device comprises a tripper car adapted to move along said defined path comprising rails on which said tripper car moves.

14. The method of claim 13 wherein said material inlet of said tripper car receives particulate material including coal from a moving conveyor belt.

15. The method of claim 13 including the further step of delivering said liquid from a source external to said tripper car or said liquid from a container mounted on said tripper car.

16. The method of claim 15 including the further step of delivering said liquid through a flexible hose that supplies said liquid from an external liquid source to said tripper car.

17. The method of tripper car of claim 12 wherein said liquid includes one or more of: water, dust suppressant liquid, or a surfactant.

18. Apparatus that transfers particulate material between locations, said apparatus comprising:
   a tripper car adapted to move along a defined path when in use substantially within a housing having at least one side wall and a ceiling;
   a material inlet on said tripper car that receives said particulate material;
   an exit duct or chutes on said tripper car for discharging said received particulate material from said tripper car; and
   spray equipment affixed to said tripper car, said spray equipment comprising nozzles having a vertical and lateral spray pattern that substantially avoids spraying of said liquid in a downward direction onto said particulate material and wherein said spray equipment sprays liquid from said tripper car to reduce the accumulation of dust on housing surfaces proximate the area in which said tripper car moves.

19. The apparatus of claim 18 wherein said defined path comprises rails on which said tripper car moves.

20. The apparatus of claim 18 wherein said material inlet is adapted to receive said particulate material including coal from a moving conveyor belt.

21. The apparatus of claim 18 wherein said liquid includes one or more of: water, dust suppressant liquid, or a surfactant.

22. A system for transferring particulate material, said system including a tripper car adapted to reciprocally travel along a defined path substantially within a housing having at least one side wall and a ceiling and means for spraying a fluid in a spray pattern directed substantially only outwardly from said tripper car as said tripper car travels reciprocally along said path such that the accumulation of dust formed of the particulate material during transfer in regions substantially external to the tripper car is reduced.

23. A system according to claim 22 where said spraying means includes a plurality of nozzles mounted on said tripper car for concurrent movement therewith, said nozzles adapted to spray said fluid laterally away from and vertically away from said tripper car.

24. A system according to claim 22 wherein said spraying means includes a plurality of nozzles mounted on said tripper car for concurrent movement therewith, said nozzles adapted to spray said fluid away from at least one longitudinal end of said tripper car.

25. A system according to claim 22 wherein said nozzles are adapted substantially to avoid the spraying of said fluid on said particulate material while said particulate material is disposed within said tripper car.

26. A system according to claim 22 wherein said spraying means includes at least one nozzle, a source of said fluid, and means for delivering said fluid from said source of fluid to said nozzles.

27. A system according to claim 26 wherein said source of fluid includes a refillable reservoir mounted on said tripper car for concurrent movement therewith and wherein said delivery means includes at least one conduct in fluid communication between said reservoir and said at least one nozzle.

28. A system according to claim 26 wherein said source of said fluid is disposed remote from said tripper car and wherein said delivery means includes a flexible, extensible, retractable hose in fluid communication between said fluid source and said at least one nozzle.

29. A system according to claim 26 wherein said at least one nozzle is adapted to be adjustably oriented in a plurality of different orientations and to be selectively maintained in a selected orientation.

30. A system according to claim 22 wherein said fluid is selected from the group consisting of a fluid formed predominantly of water, a fluid formed predominantly of a chemical surfactant, and a fluid formed predominantly of water and a chemical surfactant.

31. A system for reducing the accumulation of dust formed of particulate material in regions substantially external to a tripper car adapted to move along a defined path substantially within a housing having at least one side wall and a ceiling, said system including
a framework comprising at least one conduit and at least one nozzle, said framework adapted to be cooperatively engaged with said tripper car for concurrent movement therewith, said at least one conduit adapted to deliver a fluid therethrough to said at least one nozzle, and said framework adapted to be arranged such that fluid delivered through said at least one conduit to said at least one nozzle sprays out of said at least one nozzle substantially outwardly and away from said tripper car.

32. A system according to claim 31 wherein said system further includes means for delivering fluid from a source of said fluid to said at least one conduit.

33. A system according to claim 32 wherein said delivery means includes a flexible, extensible, retractable hose adapted to be in fluid communication with said source of fluid and said at least one conduit.

34. In a station for transferring particulate material from a conveyor belt to a storage facility, said station including a housing having at least one side wall and a ceiling, a track within said housing, and a tripper car disposed within said housing and on said track for reciprocating movement thereon, said tripper car adapted to transfer said particulate material from said conveyor belt to said storage facility, whereby such transfer tends to create a dust of particulate material, the improvement comprising:
means for spraying a fluid in a spray pattern substantially outwardly and away from the exterior of said tripper car whereby the accumulation of said dust in the regions external to said tripper car is reduced.

35. In a system according to claim 34, wherein said spraying means substantially avoids spraying said fluid onto said particulate material both prior to and during such transfer.

36. In a system according to claim 34, wherein said spraying means is adapted to substantially spray said fluid onto the interior surfaces of said at least one side wall and said ceiling.

37. In a system according to claim 34, wherein said spraying means includes means for selectively adjusting said spray pattern.

38. In a system according to claim 34, wherein said spraying means includes a plurality of nozzles mounted on said tripper car for concurrent movement therewith.

39. A method of reducing dust created during the transfer of particulate material through a tripper car adapted to move reciprocally along a defined path substantially within a housing having at least one side wall and a ceiling, said method comprising:
spraying a fluid in a spray pattern outwardly and away from said tripper car.

40. A method according to claim 39 wherein said fluid is selected from the group consisting of a fluid formed predominantly of water, a fluid formed predominantly of a chemical surfactant, and a fluid formed predominantly of water and a chemical surfactant.

41. A method according to claim 39 wherein said fluid is sprayed laterally and upwardly away from said tripper car.

42. A method according to claim 39 wherein said fluid is sprayed away from at least one longitudinal end of said tripper car.

43. A method according to claim 39 wherein said spray pattern substantially avoids said fluid being sprayed onto said particulate material both prior to and during such transfer.

44. A method according to claim 39 further comprising adjustably selecting said spray pattern.

45. A method according to claim 39 wherein said fluid is sprayed in a spray pattern outwardly and away from said tripper car substantially throughout the entire reciprocal movement of said tripper car.

46. A method according to claim 39 wherein said fluid is sprayed in a spray pattern outwardly and away from said tripper car substantially less than throughout the entire reciprocal movement of said tripper car.

47. A method according to claim 46 wherein said fluid is selectively sprayed during the reciprocal movement of said tripper car.

48. A method according to claim 39 wherein said fluid is sprayed onto the interior surface of said at least one side wall and said ceiling.

49. System for transferring particulate material from a conveyor to another location, said system including:
a tripper car adapted to travel reciprocally along a defined path substantially within a housing having at least one side wall and a ceiling, said tripper car including a chamber adapted to receive said particulate material from said conveyor and to transfer said particulate material therethrough and to discharge said particulate material at said other location, said chamber including an inlet for receiving said particulate material and an exit duct for discharging said received particulate material from said tripper car; and
spray equipment adapted to move conjointly with said chamber when said tripper car travels reciprocally along said path, said spray equipment adapted to spray a fluid in the vicinity of said chamber when said particulate material transfers therethrough in order to reduce dust formed of the particulate material during transfer from said conveyor to said other location and said spray equipment adapted to spray said fluid in a spray pattern substantially to avoid spraying said fluid onto said particulate material both prior to and during transfer of said particulate material through said chamber.

50. The system of claim 49 wherein said spray equipment is adapted to spray said fluid in a spray pattern outwardly and away from said chamber.

51. The system of claim 49 wherein said spray equipment includes a plurality of nozzles and includes means for delivering said fluid from a source of said fluid to said plurality of nozzles.

52. The system of claim 51 wherein said source of said fluid includes a refillable reservoir moveable with said chamber when said chamber travels reciprocally along said path.

53. The system of claim 51 wherein said delivery means includes a flexible, extensible, retractable hose adapted to be in fluid communication with said source of said fluid and said plurality of nozzles.

54. The system of claim 50 wherein said spray equipment is adapted to spray said fluid in a spray pattern laterally away from and vertically away from said chamber.

55. The system of claim 49 wherein said spray equipment is adapted to spray said fluid in a spray patter that is substantially directed toward said at least one side wall and said ceiling.

56. The system of claim 49 wherein said spraying equipment includes at least one nozzle adapted to be adjustably oriented in a plurality of different orientations and to be selectively maintained in a selected orientation.

57. A method of reducing dust created during the transfer of particulate material from a conveyor through a tripper car, as said tripper car reciprocally moves along a defined path substantially within a housing, to another location, said method comprising:

providing spray equipment adapted to move conjointly with said tripper car and adapted to spray a fluid in the vicinity of said tripper car when said particulate material transfers through said tripper car, as said tripper car moves, in order to reduce dust formed of the particulate material during such transfer; and spraying said fluid in a spray pattern in the vicinity of said tripper car, as said tripper car reciprocally moves, and wherein said fluid is sprayed in a spray pattern outwardly and away from said tripper car substantially throughout the entire reciprocal movement of said tripper car.

58. A method according to claim 57 wherein said fluid is selected from the group consisting of a fluid formed predominantly of water, a fluid formed predominantly of a chemical surfactant, and a fluid formed predominantly of water and a chemical surfactant.

59. A method according to claim 57 wherein said fluid is sprayed laterally and upwardly away from said tripper car.

60. A method according to claim 58 wherein said fluid is sprayed away from at least one longitudinal end of said tripper car.

61. A method according to claim 57 wherein said fluid is sprayed in a spray pattern that substantially avoids said fluid being sprayed onto said particulate material both prior to and during such transfer.

62. A method according to claim 57 wherein said fluid is sprayed in a spray pattern and further comprising adjustably selecting said spray pattern.

63. A method according to claim 57 wherein said tripper car reciprocally moves along the defined path and wherein said fluid is sprayed in a spray pattern outwardly and away from said tripper car substantially less than throughout the entire reciprocal movement of said tripper car.

64. A method according to claim 63 wherein said fluid is selectively sprayed during the reciprocal movement of said tripper car.

65. A method according to claim 57 wherein said tripper car is disposed within a housing having at least one side wall and a ceiling and wherein said fluid is sprayed onto the interior surface of said at least one side wall and said ceiling.

* * * * *